United States Patent
Kuhn

[15] 3,668,523
[45] June 6, 1972

[54] ELECTRICAL TESTING OF DIELECTRIC LAYERS, EXHIBITING VOLTAGE DEPENDENT CAPACITANCE, WITH LINEAR RAMP VOLTAGES

[72] Inventor: Matthew Kuhn, Warren Township, Somerset County, N.J.

[73] Assignee: Bell Telephone Laboratories, Incorporated, Murray Hill, Berkeley Heights, N.J.

[22] Filed: May 7, 1969

[21] Appl. No.: 822,675

[52] U.S. Cl. .................................... 324/158 D, 324/60 C
[51] Int. Cl. ............................... G01r 31/22, G01r 27/26
[58] Field of Search ............... 324/158, 158 D, 158 T, 61, 324/57, 60 R, 60 C; 29/574

[56] References Cited

UNITED STATES PATENTS

| | | | |
|---|---|---|---|
| 2,297,436 | 9/1942 | Scholz | 324/57 |
| 2,776,407 | 1/1957 | Halverson | 324/158 |
| 2,790,141 | 4/1957 | Geppart | 324/57 |
| 3,034,044 | 5/1962 | Konigsberg | 324/57 |
| 3,117,899 | 1/1964 | McLouski | 324/158 X |
| 3,206,674 | 9/1965 | Thuy et al. | 324/158 |
| 3,403,339 | 9/1968 | Nishida et al. | 324/57 X |

OTHER PUBLICATIONS

" A New Technique for Measurement of Junction Capacitance;" Semiconductor Products; February 1963; page 28.

Zaininger, K. H.; Automatic Display of MIS . . . ; RCA Review; Sept. 1966; pg. 341– 359.

Primary Examiner—Rudolph V. Rolinec
Assistant Examiner—Ernest F. Karlsen
Attorney—R. J. Guenther and Arthur J. Torsiglieri

[57] ABSTRACT

In order to test a dielectric layered structure exhibiting a voltage dependent capacitance, a metal-insulator-semiconductor (M-I-S) structure for example, a linear ramp (sawtooth) voltage is applied across the structure initially in thermal equilibrium, but at a temperature below which the insulator allows ionic impurities to become mobile. The profile of current vs. time, which thereby flows through the structure, constitutes a signal which can be rapidly electronically processed to yield information about the quality and properties of the structure.

9 Claims, 11 Drawing Figures

INVENTOR
M. KUHN
BY
ATTORNEY

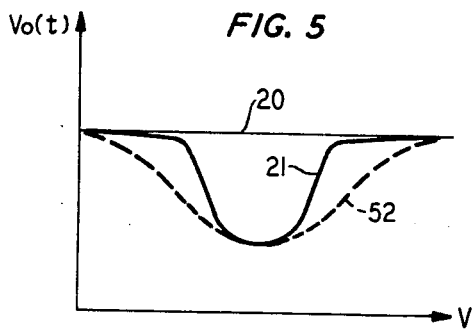
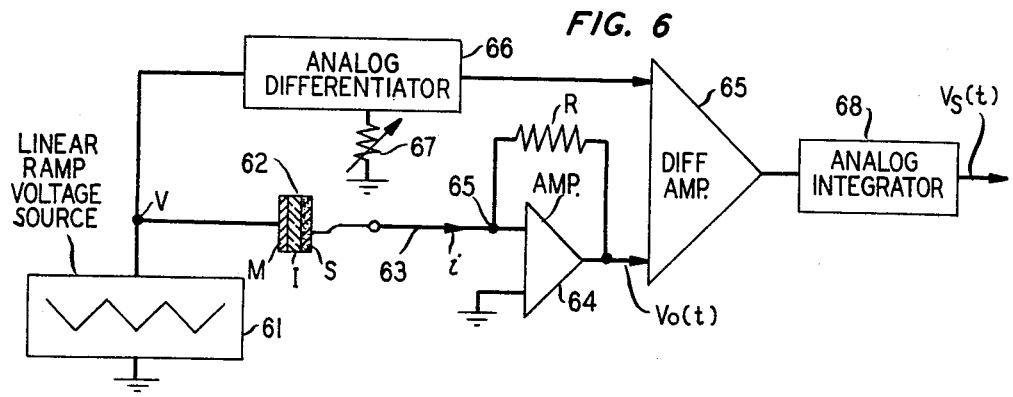
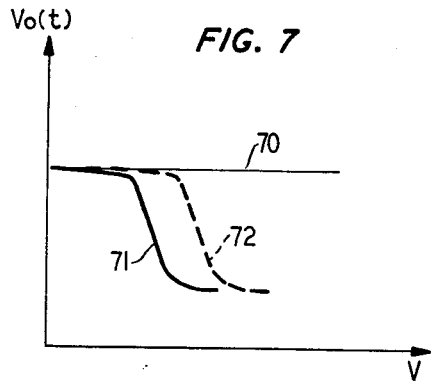
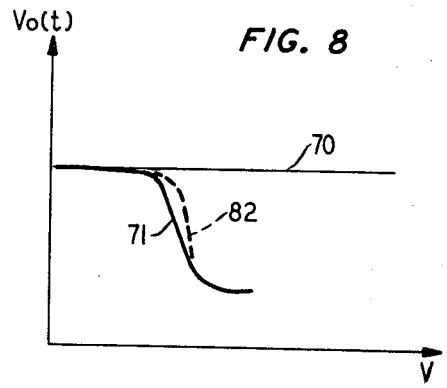
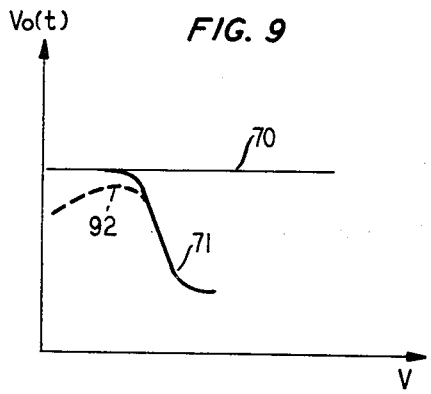
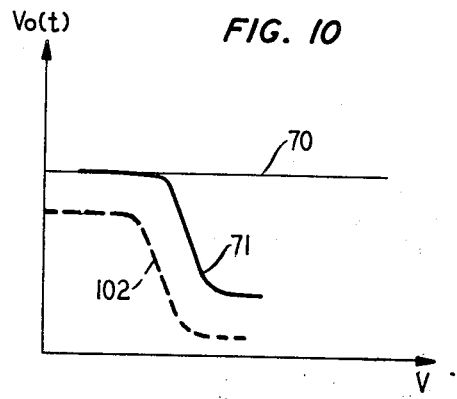

ELECTRICAL TESTING OF DIELECTRIC LAYERS, EXHIBITING VOLTAGE DEPENDENT CAPACITANCE, WITH LINEAR RAMP VOLTAGES

FIELD OF THE INVENTION

This invention relates to electrical methods of testing the properties of dielectric layers, in particular those dielectric layers which exhibit a voltage dependent capacitance.

BACKGROUND OF THE INVENTION

In the fabrication of semiconductor devices in general, insulator layers are deposited on the semiconductor body at various processing stages and for various purposes. These purposes include, for example, passivation of the semiconductor to protect it from the ambient, as well as electrical isolation of one portion of the ultimate device from another thereof. Thus, in the fabrication of insulated gate field effect transistors (IGFET's) of the metal-insulator-semiconductor (M-I-S) structure, and more particularly of the metal-oxide-semiconductor (MOS) type, the insulator oxide layer is deposited on the semiconductor to isolate the metallic "gate" electrode from the semiconductor itself. Moreover, in the fabrication of other types of transistors, such as bipolar (NPN or PNP), an insulator layer is customarily deposited for protecting the underlying semiconductor from contamination by the atmosphere or to serve as a mask for subsequent impurity diffusion into the semiconductor. In either event, it is important to know the quality and properties of such an oxide layer must after its fabrication, i.e., prior to the subsequent processing steps, in order to reject poor samples at an early stage of the overall processing. Thus, in the fabrication of bipolar transistors, especially by present day mass production methods of forming many transistors in a single substrate, a metal is deposited on selected portions of the insulator oxide just after its formation. This is done for the purpose of electrically testing the oxide at those portions of forming sample MOS structures thereat.

On the other hand, in the fabrication of many IGFET's for integrated circuits in a single substrate, it is important to know the quality and properties of the insulator layer not only at a relatively few portions but also at each and every portion thereof at which an IGFET is ultimately to be formed in the desired integrated circuit configuration. Step by step automated mercury electrode probes are presently available which apply the probe at each and every desired location on a given surface automatically. However, while the prior art includes many methods for simultaneously applying arbitrary voltages by means of such probes in order to test the insulator and/or underlying semiconductor, such test methods involve complex and time-consuming procedures for interpreting the results of these tests even to determine such an otherwise simple quantity as the differential capacitance. This differential ("incremental" or "dynamic") capacitance of the M-I-S structure is a very useful quantity whose value yields extensive information concerning the properties of the insulator and semiconductor layers. See C. N. Berglund, IEEE Transactions on Electron Devices ED–13, (1966) pp. 701–705; and A. Goetzberger and E. H. Nicollian, J. Appl. Phys. 38, 4582 (1967). As is understood in the art, M-I-S structures constitute a special case of voltage dependent capacitors; that is, they exhibit a non-vanishing derivative of capacitance with respect to voltage. Thus, there is a general class of insulator structures which yield a non-constant ratio of charge to voltage when used as the dielectric in a capacitor.

SUMMARY OF THE INVENTION

This invention affords a method for testing dielectrics exhibiting a voltage dependent capacitance in response to applied voltages. According to this invention, linear ramp (sawtooth) voltages are applied across a sample dielectric layer to be tested, under conditions of "stability" in the layer. By "stability" is meant a condition of the dielectric layer in which any ionic impurities therein are not mobile (i.e., not free to move across the insulator) but are fixed in position even under the influence of applied electric fields. Thus, the dielectric layer is in a "stable" state which is essentially devoid of significantly mobile charge carriers. Thereby the ionic impurities will at most contribute a negligible current under the electrical testing of this invention. For the common ionic impurities, maintaining the dielectric at room temperature or below generally ensures stability over the times of testing used in this invention.

In one embodiment of this invention, the electric current is monitored in response to the aforementioned linear ramp voltage. This voltage V is applied to an M-I-S layered structure by conductive means including an electrode probe in contact with selected portions of the semiconductor layer in the M-I-S structure, and a wire contact to the metal layer therein. The electrical current response thereto yields directly the quantity of interest, that is, the incremental ("dynamic" or "differential") capacitance $C'$ of the selected portion, as a function of this applied voltage, V. In turn, this functional relationship of $C'$ vs. V can be easily and quickly interpreted in order to yield the desired information concerning the properties and quality of the insulator and semiconductor layers underneath the probe.

It is advantageous to utilize "slow" linear ramp voltages applied to the M-I-S structure, in order to obtain maximum information concerning the properties of the semiconductor layer, in addition to the information concerning the insulator layer. By "slow" is meant that the rate of change of applied voltage is sufficiently low that the semiconductor remains essentially in thermal equilibrium; in particular, with respect to surface state response and formation of an inversion layer in the semiconductor near the insulator interface. This inversion layer occurs under the influence of electric fields in the semiconductor caused by the applied voltage, when these fields are directed such that minority charge carriers in the semiconductor are attracted in the semiconductor toward the insulator interface, as known in the art. Thus, under the influence of a "slow" linear ramp voltage, as thus defined, an inversion layer will have a chance to form during a portion of the test cycle. In turn, the displacement current in the M-I-S structure will then be influenced by the formation of the inversion layer; therefore, the incremental capacitance $C'$ of the M-I-S structure will also be influenced by the inversion layer. Moreover, since the creation of the inversion layer depends upon the properties of the semiconductor in the M-I-S structure, this incremental capacitance $C'$ yields further information concerning the properties of the semiconductor, in addition to the information concerning the insulator. Experimentally the criterion of "slow" ramp is satisfied if the profile of differential capacitance $C'$ versus voltage applied by the linear ramp is the same in both directions of the applied linear ramp voltage i.e., increasing voltage and decreasing voltage (positive and negative slope, respectively).

In silicon semiconductor, the time constant for creating an inversion layer is in the range of the order of 0.1 to 1.0 sec. at room temperature. Moreover, an applied voltage of at least several volts is required to create any appreciable inversion layer in silicon, in any event. Thus, in testing M-I-S structures at room temperature with silicon as the semiconductor, "slow" linear ramps with a slope in the range of the order of 1 volt/sec or less, typically in the range of 0.02 to 0.1 volt/sec, with ramp heights typically of the order of at least several volts are useful to obtain a displacement current response containing the most information (i.e., the "low frequency" incremental capacitance). However, "fast" linear ramps of the same height but with a slope of the order of about 100 volt/sec (or more) still are useful in testing such structures, especially when fast point-by-point testing of many points on the surface of the structure is desired, even though there is not enough time for formation of an inversion layer. The "fast" linear ramp is specially useful in determining doping density of the semiconductor in an M-I-S structure, whereas the "slow" linear ramp is specially useful in determining the surface state density at the semiconductor-insulator interface and the surface potential of the semiconductor relative to the insulator. Moreover, means set forth in the detailed description below can be used to speed up the ramp and still create an inversion layer in the semiconductor, in order to obtain a response corresponding to the "low frequency" incremental capacitance.

Advantageously, in any event, in accordance with another aspect of the invention the current response versus time of the sample is monitored and compared with the corresponding current response versus time of a standard dielectric or standard insulator-semiconductor layer of desired quality. In this way, either the processing steps for making the sample can be modified or the sample itself can be rejected, if its response falls outside of prescribed tolerance limits with respect to the response of the standard. Thus, it is important to know the nature of the defect in the quality of the sample in order to know when and how to modify the processing steps to improve the quality. Moreover, the electrode probe can be moved from one position to another on the sample to test each portion thereof, in order to decide whether or not the quality is sufficiently high and uniform prior to further device processing and use of the sample.

The advantage of using linear ramp voltages in testing insulators in voltage dependent capacitors, according to this invention, can be appreciated from the following considerations. The voltage dependent capacitance C is defined as usual through the equation:

$$Q = CV, \qquad (1)$$

where $Q$ is the electric charge and V is the applied voltage across the capacitor. The displacement current $i$ in the capacitor, in the general case of a time-varying voltage, is given by:

$$i = dQ/dt = C(dV/dt) + V(dC/dt). \qquad (2)$$

This displacement current $i$ is, of course, equal to the charging (discharging when negative) current in the circuit supplying the voltage V to the capacitor. Therefore $i$ represents either the displacement current or the charging current. Using the identity, $dC/dt = (dC/dV)(dV/dt)$, Eq. (2) may be rewritten as:

$$i = [C + V(dC/dV)] dV/dt \qquad (3)$$

Now, differentiating Eq. (1) with respect to voltage V, it follows that:

$$(dQ/dV) = C + V(dC/dV). \qquad (4)$$

But the incremental ("differential") capacitance, $C'$ is defined as being equal to $(dQ/dV)$ itself; and therefore it follows from this definition of $C'$ in combination with Eqs. (3) and (4) above that:

$$i = C'(dV/dt). \qquad (5)$$

Thus, if a linear voltage ramp, i.e., of the form $V = at + b$, is used where $a$ and $b$ are constants, then the incremental capacitance is given by:

$$C' = i/a. \qquad (6)$$

It should be remembered that in the case of voltage dependent capacitors, $i$ is a function of voltage. Consequently, a measurement of the current $i$ in response to the applied linear ramp voltage, $V = at + b$, yields the incremental capacitance directly (within the known multiplicitive constant, $a$). Moreover, a (scaled) plot of $C'$ vs. V is obtainable by means of the recording of a simultaneous measurement of the current $i$, and the applied voltage V (or the time $t$ to which the linear ramp V is proportional). This plot is useful in determining the properties of the insulator layer in general, and also simultaneously of a semiconductor layer underlaying the insulator layer in the case of an M-I-S structure.

In another embodiment of this invention, the surface potential $\psi_s$ of the semiconductor relative to the insulator in an M-I-S structure is determined by the following processing of the current $i$ in response to the "slow" linear voltage ramp, $V = at + b$, applied across the M-I-S structure. Again, by "slow" is meant that there is sufficient time for an inversion layer to form in the semiconductor. The instantaneous current $i$ is fed to a differential amplifier, to which is also fed the initial current $i_o$. The output of this differential amplifier is fed to an analogue integrator. In turn, the output of this integrator is the desired surface potential $\psi_s$ to within an additive constant, in accordance with this invention and the formula given by C. N. Berglund, IEEE Transactions ED-13 at p. 702 (1961). Moreover, a plot of the differential capacitance $C'$ versus $\psi_s$ yields information concerning the density of surface states in the semiconductor.

This invention together with its features, objects, and advantages can be better understood by reading the following detailed description in connection with the drawing in which:

FIGS. 2–6 show curves depicting sample results obtained with the apparatus shown in FIG. 1 in one aspect of this invention;

FIG. 6 is a diagram of apparatus useful in carrying out another embodiment of this invention; and FIGS. 7–10 show curves depicting results obtained with the apparatus shown in FIG. 1 in another aspect of this invention.

DETAILED DESCRIPTION

Slow Linear Ramp Applied Voltages

Figure 1:
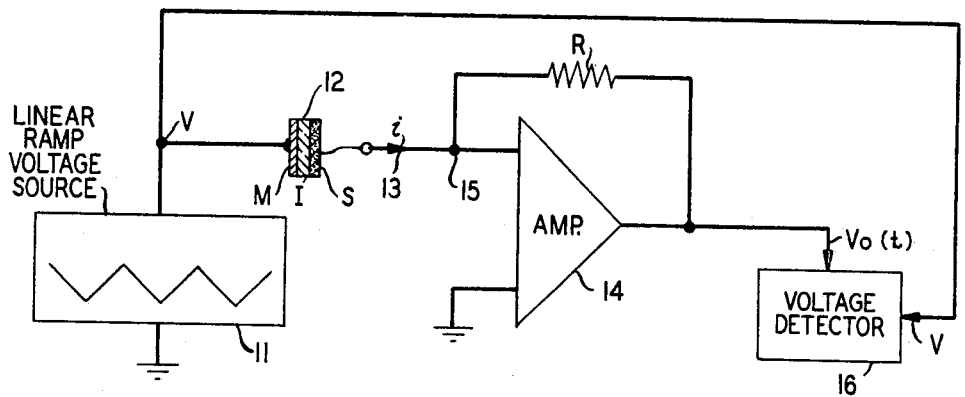
FIG. 1 is a diagram of apparatus useful in carrying out one embodiment of this invention.

As indicated in FIG. 1, a linear ramp voltage is applied to the M-I-S (metal-insulator-semiconductor) structure 12 by means of its connection to the linear ramp voltage source 11. As defined above, the insulator layer is maintained in a state which is essentially devoid of significantly mobile charge carriers. Advantageously, the initial value of the applied voltage V supplied by the source 11 is selected such that initially the voltage applied to the metal side of the structure 12 is sufficiently positive for N-type semiconductor (negative for P-type), in order initially to cause strong accumulation ("enhancement") of majority carriers in the semiconductor; and the voltage V applied from the source 11 decreases (increases for P-type) along the ramp immediately thereafter. The period of a single ramp is advantageously sufficiently slow so that an inversion layer is formed in the semiconductor at the end of the ramp. While this voltage ramp V is applied to the metal side of the M-I-S structure 12, the probe (not shown) attached to one end of the lead wire 13 contacts the desired portion of the semiconductor surface in the M-I-S structure 12. The other end of the lead wire 13 is connected to the high gain amplifier 14, which draws relatively negligible current compared with the displacement current in the M-I-S structure. The conduction current $i$, equal to this displacement current, flows in the lead wire 13. By reason of the negative feedback in the high gain amplifier 14, supplied by the resistor R connected to the output of this amplifier and to the lead wire 13, the point 15 is kept substantially at ground potential, as known in the art. Thereby, assuming no leakage currents, the current in the resistor R is almost exactly equal to the current $i$ in the lead wire 13 and hence to the displacement current in the M-I-S structure 12; and thus the output voltage $V_o(t)$ of the amplifier 14 is equal to this current $i$ multiplied by the resistance of the resistor R. In other words, this output voltage $V_o(t)$ divided by R is equal to the displacement current in the M-I-S structure 12. Moreover, in accordance with Eq. (6) above, this displacement current divided by $a$, the voltage ramp parameter (i.e., the slope of the linear voltage ramp of the form $V = at + b$) gives the incremental capacitance $C'$ of the portion of the M-I-S structure 12 under the probe attached to the lead wire 13. It should be understood that the amplifier 14 in combination with the resistor R can be obtained with many electrometers presently commercially available.

The voltage output $V_o(t)$ of the amplifier 14 in response to the current $i$ is fed to the voltage detector 16, such as the vertical plates of a cathode ray oscilloscope whose horizontal plates are fed by the applied linear ramp voltage directly from the source 11. Thereby, the display on the oscilloscope serving as the voltage detector 16 is the desired (scaled) representation of the incremental capacitance $C'$ of the M-I-S structure 12 versus the voltage V applied thereto. This display, as obtained in response to a sample structure 12, can be compared with the display in response to a standard structure 12 of desired quality and properties; for example, by means of a mask on the face of the oscilloscope voltage detector 16 corresponding to the standard, or by means of other techniques known in the art including masks in combination with photocell detectors (not shown). If the sample display deviates from the standard by more than a predetermined amount, corresponding to a desired quality tolerance (which can correspond to different criteria at different portions of the display), then the sample is rejected; and also, the processing steps themselves used to fabricate the sample M-I-S structure 13 can be modified according to the type of defect in quality detected thereby. All this will become clearer from the discussion of the results shown in FIGS. 2–5, and 7–10, which is related, at least in part, to the work of C. N. Berglund, IEEE Transaction on Electron Devices, ED–13 No. 10, p. 701 (1966), and by the work of A. Goetzberger and E. Nicollian, Journal of Applied Physics, Vol. 38, No. 12, p. 4582 (1967)

Figure 2:
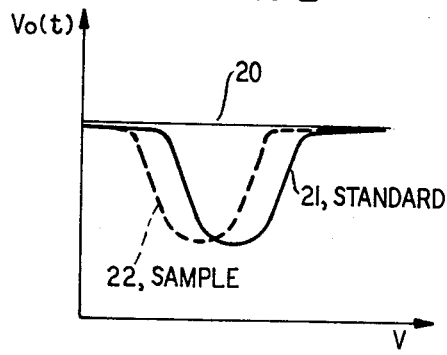

Curve 21 in FIG. 2 shows an example of a standard curve of incremental capacitance C' vs. V, i.e., in response to the linear ramp voltage from the source 11 applied to a standard M-I-S structure 12. Initially, at the left-hand end of the curve, the semiconductor in the structure 12 is in the state of "accumulation" (of majority carriers); and finally, at the right-hand end of this curve, this semiconductor is in the state of "inversion" (layer), in response to the applied linear ramp voltage from the source 11. The applied voltage V, at which the dip in this curve 21 occurs, is linearly related to the quantity of nonmobile ("fixed") charge in the insulator in the standard M-I-S structure 12.

The dotted curve 22 in FIG. 2 shows a sample curve of incremental capacitance C' vs. V, i.e., in response to the linear ramp voltage from the source 11 applied to a sample having fixed charge in the insulator different from that in the standard. By reason of a "slow" linear ramp from this source 11, both curves 21 and 22 are tangent to the horizontal line 20 at both their respective right and left-hand ends; provided the linear ramp is sufficiently slow such that the inversion layer has a chance to form on both structures 12, sample and standard. Except for the difference in fixed charge of the sample structure 12 compared with the standard structure 12, these curves 21 and 22 would be the same. However, due to the difference in the fixed charge in the insulator layer of these structures 12, the horizontal location of the dips in these curves differ. However, all other factors being equal, the area between curves 21 and 20 is equal to the area between curves 22 and 20. In fact, the shift of the dip in the horizontal direction is directly proportional to the difference in quantity of fixed charge in the insulator layer in these sample and standard structures 12.

Figure 3:
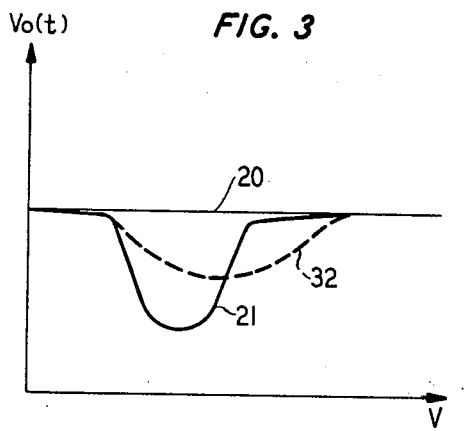

FIG. 3 shows the same curve 21 of the response of the standard structure 12; but the curve 32 now represents the response of another sample structure 12 having a higher surface state density in the semiconductor thereof than both the standard and the previous sample shown in FIG. 2. Again, by reason of the ramp from the source 11 being sufficiently "slow, " for example, inversion layers are created in both standard and sample structures 12. Therefore, both curves 21 and 32 are tangent at both ends to the horizontal line 20. Moreover, the area between curves 21 and 20 is equal to the area between curves 32 and 20, provided the only difference between these sample and standard structures 12 lies in the surface state density.

Figure 4:
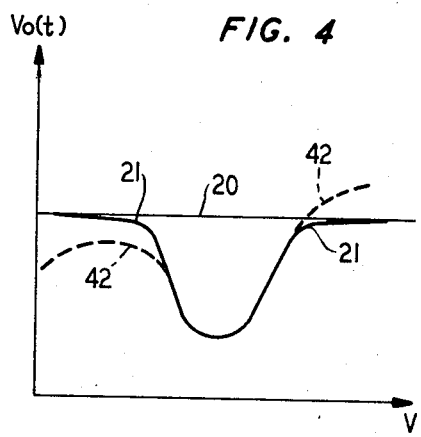

FIG. 4 shows the effect of leakage in the insulator of the structure 13. Instead of being tangent to the horizontal line 20 in FIG. 4, the dotted curve 42 in response to a leaky M-I-S sample 12 bends downwards at its left-hand end (corresponding to the accumulation state), and bends upwards at its right-hand end (corresponding to an inversion state). This bending of curve 42 is due to leakage current through the leaky sample 12. This leakage current is in the nature of a conduction current from semiconductor to metal (or vice versa), through the insulator layer of the sample M-I-S structure 12. This is to be distinguished from the displacement current obtained by reason of significant mobile charges in the insulator, which is due to motion of charges in the insulator but wherein the charges do not pass from or to the insulator across the insulator boundaries with either the metal or semiconductor in the structure 12. For example, the paper of M. Yamin, IEEE Transactions Electron Devices, ED–12, 88 (1965), deals with the displacement current of mobile changes in the insulator.

FIG. 5 shows the effect of gross nonuniformities in the insulator layer in the M-I-S sample structure 12. In this case, the area between the dotted curve 52 (corresponding to this nonuniform sample) and the horizontal tangent curve 20 is larger than the area between the standard M-I-S curve 21 and the same horizontal curve 20.

It should be noted that except for curve 42 in FIG. 4, both ends of all curves produced by sample and standard structures 12 in FIGS. 2–5 are tangent to the horizontal curve 20. In particular, this property of being tangent to curve 20 at the right-hand end of these curves is due to the fact that the applied linear ramp voltage from the source 11 is sufficiently "slow" for the inversion layer to be created in the semiconductor in all these structures 12.

FIG. 6 shows a circuit for measuring the surface potential $\psi_s$ of the semiconductor relative to the insulator in the M-I-S structure 62. Advantageously, the capacitance of the insulator layer is voltage independent; while the capacitance of any semiconductor layer is voltage dependent. A slow linear ramp voltage V is supplied by the source 61 to the M-I-S structure 62 to be tested. Thereby, the semiconductor in the M-I-S structure is driven from accumulation to inversion. A probe (not shown) at the end of the wire lead 63 contacts a portion of the surface of the semiconductor in the structure 62. The wire lead 63 feeds the electric current response i of this structure 61 to the high gain amplifier 64. The negative feedback resistor R keeps the point 65 at substantially ground potential. Thereby, the output voltage $V_o(t)$ of the amplifier 64 is proportioned to the incremental capacitance C' of the portion of the M-I-S structure 62 under the probe (not shown) attached to the lead wire 63, just as the output $V_o(t)$ described above in conjunction with FIG. 1. This output voltage $V_o(t)$ is fed to one input side of the electronic difference amplifier 65. The other input side of the difference amplifier 65 is fed by the output of the electronic analogue differentiator 66. In turn, the differentiator 66 is fed by the output of the linear voltage ramp source 61. Thus, the output of the differentiator 66 is proportional to the slope of the linear voltage ramp supplied by the source 61 simultaneously to the structure 62. Advantageously, the linear ramp supplied by the source 61 commences such that the voltage V supplied to the M-I-S structure 62 places the semiconductor in the (majority charge) accumulation state, and subsequent voltages on the ramp tend to drive out majority carriers and ultimately to force the semiconductor into the inversion layer state. In this way, provided the ramp voltage has a sufficient height (of the order of a few volts), the initial incremental capacitance C' will be wholly attributable to the voltage independent insulator layer capacitance alone, i.e., initially excluding the semiconductor layer in the accumulation state which behave like a metal. Thus, the analogue integrator 68 fed by the output of the differentiator 65 yields and output signal $V_s(t)$ which satisfies:

$$V_s(t) \propto \int_0^t [1-(C'/C_l)]dt, \qquad (7)$$

where $C_l$ is the (voltage independent) capacitance of the insulator layer. On the other hand, due to the linearity of the ramp voltage $V = at + b$ supplied by the source 61:

$$dt = dV/a. \qquad (8)$$

Therefore, combining Eqs. (7) and (8), the output $V_s(t)$ satisfies:

$$V_s(V_2) - V_s(V_1) \propto \int_{V_1}^{V_2} [1-(C'/C_l)]dt, \qquad (9)$$

where $V_2$ and $V_1$ are the final and initial voltages, respectively, on the linear ramp supplied by the source 61; while $V_s(V_2)$ and $V_s(V_1)$ are the final and initial output signals of the analogue integrator 68. By comparing the integral in Eq. (9) above with the expression given by C. N. Berglund, IEEE Transactions, ED-13, at p. 70, it is seen that the final and initial surface potentials $\psi_s(V_2)$ and $\psi_s(V_1)$, respectively, are related to these output signals $V_s(V_2)$ and $V_s(V_1)$ according to an equation of the form:

$$\psi_s(V_1) - \psi_s(V_2) = k [V_s(V_1) - V_s(V_2)], \quad (10)$$

where $k$ is a constant. Thus, the difference in surface potential between any applied voltages $V_1$ and $V_2$ can be determined from the difference in output $V_s$ at these applied voltages, to within a multiplicative constant $k$. In turn, this multiplicative constant can be made equal to unity by adjusting the time constant of the analogue integrator 68 to be equal to one (1) second.

The surface potential $\psi_s$ is useful in the determination of many other properties of the M-I-S structure 62. For example, if the magnitude of $|\psi_s(V_2) - \psi_s(V_1)|$, evaluated with $V_1$ at strong accumulation and $V_2$ at strong inversion, is larger than that for a uniform but otherwise identical standard structure 62, then the sample structure 62 suffers from gross nonuniformities. Moreover, as can be shown from Berglund's above mentioned paper, the number of surfaces states $N_{ss}$, per unit area per unit energy, of semiconductor-insulator interface of a sample M-I-S structure 62, is given by:

$$N_{ss} = (D/\epsilon e) [C'C_i/(C_i - C') - C_{sc}], \quad (11)$$

where $D$ is the thickness of the insulator layer of the structure 61, $\epsilon$ is the dielectric constant of this insulator layer, $C_{sc}$ is the capacitance of an ideal semiconductor layer (no surface states), and $e$ is the electronic charge. Of course, $C_{sc}$ can be obtained by known theory or else $C_{sc}$ can be treated as an additive constant in Eq. (11) for all sample structures 61 which are geometrically identical. It should be understood that the surface state density $N_{ss}$ depends upon the voltage V applied to the M-I-S structure 62, and this is reflected in Eq. (11) in the dependence of $C'$ upon this applied voltage V.

It should be obvious that the analog differentiator 66 can be replaced by a "sample and hold" device to produce a constant output for the difference amplifier 65. Moreover, there are many electronic analog equivalents in the present art of the arrangement shown in FIG. 6, including equivalents for the amplifiers 64 and 65, the differentiator 66, and the integrator 68.

Elevating the temperature of the M-I-S structure, for example, in the range of between about 100° to about 300° C. in the case of silicon as the semiconductor, affords a means for decreasing the time constant of the inversion layer. Thus this elevation of temperature affords a means for increasing the slope of the ramp and thereby for decreasing the time required for testing the M-I-S structures 12 or 62, while still forming an inversion layer therein. In this way, a ramp, with a slope of the order of about one-to-10 volt/sec. from the sources 11 or 61 can be used. Thus the test cycle can be reduced to the order of one second or less. However, care must be taken that, in applying heat to speed up the processes in the insulator, any charges in the insulator do not become mobile. Therefore, in silicon for example, it is important that the temperature not be elevated above 300° C., i.e., it is important that charges in the insulator remain fixed in position during testing according to this invention.

Additionally or alternatively, the testing time can be reduced by sweeping the voltage ramp in a direction such that initially the semiconductor contains the inversion layer (instead of accumulation of majority carriers), and this inversion layer thereafter disappears by reason of the further voltages of the ramp (i.e., "accumulation" of majority carriers). In such cases, while the sweep rate of the ramp can be increased by way of increased slope of the ramp, it then becomes important initially to ensure the existence of the inversion layer. This can be accomplished by first applying a continuous flat pulse of relatively high voltage (as compared with the linear ramp voltage height), before applying the linear ramp voltage itself from the source 11. The flat pulse height is chosen such that it is sufficient to create an inversion layer quickly in the semiconductor. When the resulting current $i$ in response to the flat pulse has decayed to zero, the linear voltage ramp of about one to ten volt per second is then applied to the structures 12 or 62, but now the ramp commences with that direction of voltage corresponding to the tendency of formation of an inversion layer in the semiconductor in the structures 12 or 62. Thereafter the linear ramp from the source 11 drives the semiconductor into the accumulation state.

Instead of the flat voltage pulse just described, the testing time can be reduced by optical means in conjunction with the linear voltage ramp of about one to 10 volt per second from the source 11 (but again initially in a direction which tends to create an inversion layer). A momentary shining of light on the semiconductor in the structures 12 or 62 (just prior to the application of the initial portion of the linear ramp voltage to the structure 12 or 62) can be used to generate electron-hole pairs therein for relatively instantaneous formation of the inversion layer when the linear ramp voltage is applied from the source 11 or 61. In this way, the current response $i$, just after the light is turned off and the linear ramp voltage is applied, corresponds to the existence of an inversion layer. Thereafter, the linear ramp from the source 11 drives the semiconductor into the accumulation state, while the current response $i$ processed as described above in connection with FIGS. 1 and 6.

Thus linear ramp voltages can be applied to the standard and sample M-I-S structures 12 or 62 in combination with either elevated temperatures, auxiliary flat voltage pulses, or light applied to the structures. Thereby, the testing time can be reduced without loss of any information concerning the properties and quality of the M-I-S structure 12 or 62. "Fast" Linear Ramp Voltages In addition, "fast" linear ramp voltages, of the order of about 100 volt per second or more, supplied by the source 11 can be used to advantage even in the absence of sufficient time for the formation of an inversion layer or for the response due to surface states in the semiconductor in the M-I-S structure 12. In such cases, advantageously the linear ramp from the source 11 in the arrangement shown in FIG. 1 commences with a voltage of the order of a few volts in the direction corresponding to the "accumulation" state of the semiconductor. In this case the instability of the insulator due to ionic charge carriers therein is less important than in the case of "slow" ramps because of the relatively short time of a single test period of time. However, in such cases the responses $V_o(t)$ are somewhat different from those shown in FIGS. 2 through 5 above. In particular, FIG. 7 shows the curves 71 and 72 of the response $V_o(t)$ of the standard and sample M-I-S structures 12, respectively to which the linear ramp voltage V from the source 11 is applied. The horizontal line 70 is the common horizontal tangent to curves 71 and 72. The horizontal shift in curve 72 relative to curve 71 is still proportional to the fixed charge density in the insulator layer of the corresponding structures 12; just as in FIG. 2, curves 21 and 22. Thus, fast point by point testing of fixed charge in M-I-S structure is feasible with linear ramp voltages of the order of about 100 V/s or more and a ramp height of the order of a few volts, even in the absence of the formation of an inversion layer in the semiconductor.

Figure 7A:
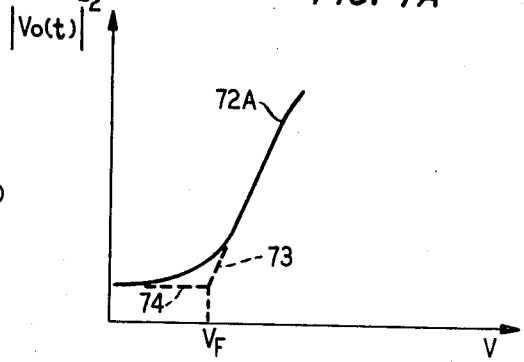

As illustrated in FIG. 7A, it is useful to display the curve 72A, i.e., the plot of the response $[V_o(t)]^{-2}$ vs. V, the applied voltage supplied by the source 11. Conveniently, this curve 72A can be displayed on the cathode ray oscilloscope serving as the voltage detector 16, by means of an analogue square and invert device (not shown in FIG. 1) inserted between the output $V_o(t)$ and the input to the vertical plates of the oscilloscope. Thereby, information concerning the doping level and the flat-band or threshold voltage of the semiconductor can be obtained. In particular, this doping level is inversely proportional to the slope of the linear portion of the output $[V_o(a[])]^{-2}$ vs. V, as described in the above-mentioned paper of Goetzberger and Nicollian in the Journal of Applied Physics. Moreover, the standard or sample flat-band or threshold voltage $V_F$ of the M-I-S structure can be obtained by locating the intersection of tangents 73 and 74 to the corresponding [$V_o(t)$]$^{-2}$ curve, as indicated in FIG. 7A.

Curves 71 and 82 in FIG. 8 show the responses $V_o(t)$ of standard and sample M-I-S structures 12 to "fast" linear ramp voltages V from the source 11, again in which there is no time for the formation of an inversion layer in the semiconductors of the sample and standard structures 12. The horizontal line 70 is the common horizontal tangent to curves 71 and 82. But here, the distortion of the sample curve 82 relative to the standard curve 81 is an indication of the presence of increased surface state in the semiconductor in a portion underneath the probe.

Curves 71 and 92 in FIG. 9, correspond to the responses $V_o(t)$ of standard and sample M-I-S structures 12 respectively, in response to the linear voltage ramp V from the source 11. Again the linear ramp from the source 11 is so fast that there is insufficient time for the formation of an inversion layer in the semiconductor in the structures 12. Now, however, in at least a portion underneath the probe, the sample structure 12 is "leaky," i.e., the insulator layer therein allows the passage of conduction current therethrough. Due to the "leaky" sample structure 12, the sample curve 92 is not tangent to the horizontal line 70, the tangent to the standard curve 71.

Curves 71 and 102 in FIG. 10 correspond to the responses $V_o(t)$, of standard and sample M-I-S structures 12, respectively, in response to the linear voltage ramp V from the source 11. Here, the insulator layer in the sample structure 12 suffers from gross nonuniformities in at least a portion underneath the probe. These gross nonuniformities include nonuniformities in thickness or dielectric constant. Here again, the voltage ramp from the source 11 applied to the structure 12 is so fast that there is not enough time for an inversion layer to form. Nevertheless, the non-uniformities cause a change in intercept on the $V_o(t)$ axis of the sample structure relative to the standard structure. Both curves 71 and 102 however are tangent to a horizontal line at the position of their respective intercepts on the $V_o(t)$ axis, so that nonuniformities are thereby distinguishable from "leakage" in the insulator layer. It should be noted that although the sample curve 102 is depicted as lying below the standard curve 71 (due to decreased capacitance), nonuniformities can also cause the sample curve 102 to be displaced above the standard curve 71 (due to increased capacitance). In addition, nonuniformities either in the insulator layer or the semiconductor layer (graded doping level, for example) will prevent the existence of any straight line region in the plot of $|V_o(t)|^{-2}$ vs. the applied linear ramp voltage V.

It is obvious that gross nonuniformities will also cause a change of the intercept of the response curve on the $V_o(t)$ axis, in testing with a "slow" linear ramp voltage.

The above detailed description has been in terms of testing M-I-S structures with linear voltage ramps. These particular structures are ordinarily characterized by a voltage dependent capacitance due to the semiconductor layer. However, it should be obvious to the workers in the art that the linear ramp voltage testing is useful to yield directly the incremental capacitance of any structure characterized by a voltage dependent capacitance, such as nonlinear dielectric insulator layers.

What is claimed is:
1. The method of electrically testing a two terminal structure having a voltage dependent capacitance in response to voltages applied across the structure, which comprises the steps of:
   a. maintaining said structure in a state which is essentially devoid of significantly mobile charges;
   b. applying a linear ramp voltage across said structure in said state;
   c. monitoring the instantaneous current through the structure in said state while said voltage is applied thereto in the absence of any other time varying voltage applied thereto.
2. The method recited in claim 1 in which the structure is a metal-insulator-semiconductor layered structure.
3. The method recited in claim 2 in which the insulator is characterized by a voltage independent capacitance, and the semiconductor is characterized by a voltage dependent capacitance in response to applied voltages.
4. The method of testing a structure in accordance with claim 2 in which the period of a single ramp of the linear ramp voltage is sufficient for the formation of an inversion layer in the semiconductor at some time while the linear ramp voltage is being applied to the structure.
5. The method of testing a structure in accordance with claim 2 which includes the added step of applying to the structure a flat voltage pulse, prior to the step of applying the linear ramp voltage, sufficient to create an inversion layer in the semiconductor when the linear ramp voltage is applied to the structure.
6. The method of testing a structure in accordance with claim 2 which comprises the further step of shining light upon the structure prior to the step of applying the linear ramp voltage, sufficient to create an inversion layer when the linear ramp voltage is applied.
7. The method recited in claim 2 in which the semiconductor is essentially silicon and the linear ramp voltage is characterized by a slope of less than approximately 1 volt per second.
8. The method of electrically testing a structure according to claim 1 in which the step of monitoring is performed by means which include an electronic current monitoring device whose output is fed to a cathode ray oscilloscope.
9. The method of electrically testing a two-terminal, metal-insulator-semiconductor, layered structure in which the insulator is characterized by a voltage independent capacitance and the semiconductor is characterized by a voltage dependent capacitance in response to applied voltages, which comprises the steps of:
   a. maintaining said structure in a state which is essentially devoid of significantly mobile charges;
   b. applying a linear ramp voltage across said structure in said state;
   c. monitoring the instantaneous current through the structure in said state while said voltage is applied thereto;
   d. monitoring the difference between the instantaneous current and the initial value thereof, to produce a time-dependent electric signal which is proportional to said difference; and
   e. integrating electrically said signal over a predetermined period of time.

* * * * *

UNITED STATES PATENT OFFICE
CERTIFICATE OF CORRECTION

Patent No. 3,668,523   Dated June 6, 1972

Inventor(s) Matthew Kuhn

It is certified that error appears in the above-identified patent and that said Letters Patent are hereby corrected as shown below:

Column 1, line 29, "must" should read --just--.

line 37, "of" should read --by--.

Column 8, line 73, "$[V_o(a[)]^{-2}$" should read -- $[V_o(t)]^{-2}$ --.

Signed and sealed this 26th day of December 1972.

(SEAL)
Attest:

EDWARD M. FLETCHER, JR.  ROBERT GOTTSCHALK
Attesting Officer        Commissioner of Patents